United States Patent Office 3,197,983
Patented Aug. 3, 1965

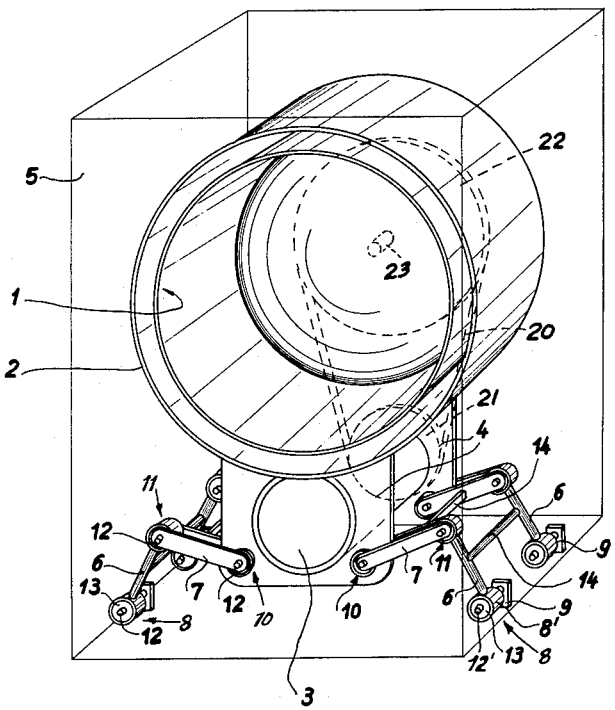

3,197,983
RESILIENT SUPPORT FOR ROTOR ASSEMBLY
Erwin Ilmer, Hohr-Grenzhausen, Germany, assignor to Clemens August Voigt, Hohr-Grenzhausen, Germany
Filed Aug. 22, 1962, Ser. No. 218,740
Claims priority, application Germany, Aug. 23, 1961, V 21,213/61
6 Claims. (Cl. 68—24)

This invention relates to supports for rotor assemblies and more particularly to supports for assemblies of washing machines including a rotating drum in which washing, rinsing and ordinarily also centrifugal drying is carried out. My present invention is especially concerned with a resilient suspension of rotors, for instance, drum type washing machines.

Drum type washing machines are known. The drum in which washing and other operations are performed is rotatably mounted in a tank which holds a liquid, and is connected through a belt to a motor usually fixed below the tank. It is known to provide such washing machines, inside a housing of the respective machine, with helical suspension springs made of steel and also with damping means for reducing amplitudes of resonance, that is, minimizing the effect of coincidence between the natural frequency of vibration and the frequency of a forced vibration. When an external stimulus which produces forced vibration is exactly in step with the natural frequency or the frequency of free vibration, for instance, of a washing machine, as is the case, for example, during the transition from the washing to the centrifuging operation, violent vibration occurs, which makes the use of damping means necessary. However, the known damping means, due to its dependence on the operating speed, have a considerable stiffening effect on the entire spring system when frequencies are high.

Thus, it is the primary object of the invention to generally improve suspension means for rotors, such as drum type washing machines.

Another object of my present invention is to provide suspension means which also act as damping means.

It has been recognized that when a washing machine of the referred to type is set up without being fixedly secured to a support, the free vibrations with respect to existing degrees of freedom in vertical direction, transverse direction, and in vertical-transverse planes must be so low that the forces transmitted to the housing of the machine, when the machine passes through the resonance and when it is in operation, will be so small that the machine even when considerable unbalances occur will not move relative to its set up position. This requirement has so far not been met. It is, therefore, a further, and important, object of the present invention to provide suspension means which satisfy said requirement.

The aforesaid objects and such other objects of this invention as will be apparent from the following description are achieved by providing, broadly, a rigid rotor assembly which comprises stationary support means, independent stationary support means, an elastic suspension means secured to both the first and second named support means. The suspension means include one or more systems of links, whereby each system is formed by rods and joints, and the rods and joints of each system lie in a single plane. The joints are provided between adjacent rods to join same, and also at the free ends of terminal rods to pivotally fix the terminal rods to the aforesaid first and second named support means. The joints of each system admit of motion of the system in the respective plane between a position of equilibrium and vibration positions. All of the joints of a system or at least a number of the joints of a system are formed to act torsionally and thus to tend to restore the position of equilibrium from any vibration position.

The specification is accompanied by a drawing in which:

FIG. 1 shows by way of example in a perspective view a drum type washing machine assembly embodying features of my invention;

FIG. 2 is an elevational view of a detail, drawn to enlarged scale; and

FIG. 3 is a sectional view of another detail to enlarged scale.

Referring to the drawing in greater detail now, and initially to FIG. 1, a drum 1 is rotatably mounted in a tank 2 which, aside from any vibrations to which it may be exposed, is stationary. The drum and tank are of cylindrical shape and horizontally and coaxially arranged. A driving motor 3 is secured to the tank 2 by means of bearing plates 4 or any other suitable mounting means. The motor is preferably provided in the vertical plane of symmetry of the drum and tank. It drives a pulley 21 for driving, through a belt 20, a pulley 22 and a shaft 23 of the drum 1. The pulley 22 is secured to the shaft 23. The drum, tank, and motor are placed in a stationary housing 5. The tank 2 constitutes the stationary support means hereinbefore referred to, while the housing 5 constitutes the referred to independent stationary support means. The tank 2, drum 1, and motor 3 are freely suspended by means of two identical system of links to be in a balanced condition.

Each of these systems consists of two groups of adjacent rods 6, 7, two groups of joints 8, 11, and 10, and a bearing plate 4. The two systems of links extend in parallel and vertical planes perpendicular to the longitudinal axis of drum and tank. The rods 6, 7 are joined by the joint 11, and the free ends of these rods are secured by means of the joint 8 to the housing 5, and by the joint 10 to one of the bearing plates 4, respectively. The joint 8 is connected to a fixed pivot in the housing 5, whereas the joint 10 is connected to a pivot in the respective bearing plate 4, which is adapted to shift slightly. In the showing selected for illustration, all six joints of each system of links are formed to act torsionally, that is, to tend to produce restitution, when twisted about the axis of the respective joint. The pivot axes 12 of all the joints are parallel to the axis of the drum and tank. In each of the joints, a pivot is fixedly connected to one part of the substantially two-part joint, whereas the other part is connected through torsional means 13 to a movable adjacent rod of the system.

In the construction shown, each of the two bearing plates 4 forms a central portion of the respective link system. Thus, the bearing plates seem to divide each link system into two groups, each group consisting of two rods and three joints. Rather than being fixed at spaced points to motor-mounting means, such as the bearing plates 4, two groups of links of one and the same system may be centrally fixed at one and the same point so that the two groups actually form a single continuous group.

To stabilize the systems of links and to make the systems react uniformly, the rods 6, 7 of both systems are connected to each other by tie rods 14.

The systems shown are six-joint systems which have proved to be both simple and highly effective. In a six-joint system, it has been found most advantageous to use torsional joints in all six places. Yet, a smaller number may also be used to ensure rather effectively vibration-free support. However, at least four torsional joints must be used in six-joint systems.

For the effectiveness of a six-joint link system or of systems having more than two pairs of rods and more than two pairs of three joints, the use of torsional joints is essential. The torsional joint of the invention uses resilient means which produce a moment of restitution.

For optimum efficiency of multiple joint link systems of the type shown, it is preferred to provide adjacent rods of equal length. Also, it is advantageous to provide for adjacent rods to form, when under static load, an angle of substantially 90°.

Torsional joints as used according to the invention may be provided in different ways. They may be made for instance, of rubber and metal sleeves in form of rubber-metal sleeve bearings. Such a rubber-metal sleeve bearing structure consists of concentrically arranged metal sleeves between which rubber is inserted either by pressure or vulcanization to adhere firmly to the metal sleeves. A pivot pin is inserted into the inner sleeve, but such a pin may as well be used instead of an inner sleeve, in which case a rubber sleeve is made to adhere to a metal sleeve and the pin is inserted into the rubber sleeve.

In FIG. 2 a torsional joint 10 is shown. It will be seen that a torsional element 13 is interposed between an inner metal sleeve 18 and an outer metal sleeve 19. The element 13 consists, for instance, of rubber and, thus, constitutes a rubber sleeve. The metal sleeve 18 is fixed to a pin 12a which coincides with the respective pivot axis 12. The pin 12a is secured to one of the bearing plates 4, and rods 7 are fixedly connected to the pin 12 so that swinging movements of the washing machine assembly, especially in any direction in the plane of the drawing, will cause the rods 7 to pivot with respect to the bearing plate 4. The metal sleeve 19 possesses an axial slot 17 to be radially pretensioned when the sleeve is compressed to a smaller diameter for introduction in a bore in the bearing plate. The slot 17 serves to facilitate the introduction of the sleeve 19.

Reverting to FIG. 1, the rod 6 is shown in each of the joints 8 to be connected to a sleeve 8', while a pin 12' appears inserted in the torsional element 13 interposed between the pin 12' and the sleeve 8'.

FIG. 3 shows one of the joints 11. A pin 12" which coincides with the respective pivot axis 12 has fixedly connected thereto rods 7. There are an inner sleeve 16 and an outer sleeve 15 the latter being received within the body of a joint 11. The sleeve 15 may be provided with a longitudinally extending slot as is sleeve 19 of FIG. 2. The rod 6 is fixed to the body 11.

The axial slot in the outer wall of a rubber-metal sleeve may also be used for the introduction of the torsional element proper therethrough. The torsional or elastic element may be pretensioned in radial and in twisting directions and inserted in such pretensioned condition, which provides, firstly, for the static load to be taken up and, secondly, for a resilient bearing as required by the present invention.

As for joints which are not of a torsional type, they may be of any conventional design, preferably of a type which requires no servicing. They include, for instance, sleeves of plastic or other suitable materials.

It is believed that the construction and operation of a preferred form of assembly for practicing the invention, and the many advantages thereof, will be fully understood from the foregoing detailed description. It will be apparent that it is possible, for instance, by virtue of a two-rod and three-joint system of links on each side of the plane of symmetry, and by virtue of the length of the system and the stiffness of the torsional means, to arrange for the natural frequencies to be the same in vertical direction, transverse direction, and in vertical-transverse planes without providing an additional mass on the oscillating system. These natural frequencies are advantageously about 3 cycles per second. The elastic suspension means of the invention make it possible to dispense with the usual type of damping means, such as telescopic impact dampers, friction dampers, etc. They provide sufficient damping action to reduce resonant vibration.

It will be apparent that while I have shown my invention in one form only, many changes and modifications may be made without departing from the spirit of the invention defined in the appended claims.

I claim:
1. A rotor assembly comprising
    (a) first stationary support means for directly supporting the rotor of said rotor assembly,
    (b) second stationary support means, and
    (c) resilient suspension means interposed between said first and second support means, and being constituted by two groups of rigid members and joints, each of said groups including
        (1) two elongated rigid members, each having a first and second end portion,
        (2) a central joint pivotally connecting the first end portions of said rigid members, said rigid members extending substantially sideways away from said central joint in an angular position with respect to each other,
        (3) two terminal joints pivotally connecting the second end portions of said rigid members to said first and second support means, said terminal joints thus being disposed in a substantially lateral relationship, with said central joint being a distance away from a substantially laterally extending line connecting said terminal joints, said group further including
        (4) yieldably resilient means incorporated in at least a portion of said central and terminal joints, said central and terminal joints serving to prevent transmission of vibrations of said rotor.
2. A washing machine comprising
    (a) a tank,
    (b) a drum rotatably mounted in said tank,
    (c) a stationary housing enclosing said tank, and
    (d) resilient suspension means interposed between said tank and housing, and being constituted by two groups of rigid members and joints, each of said groups including
        (1) two elongated rigid members, each having a first and second end portion,
        (2) a central joint pivotally connecting the first end portions of said rigid members, said rigid members extending substantially sideways away from said central joint in an angular position with respect to each other,
        (3) two terminal joints pivotally connecting the second end portions of said rigid members to said tank and housing, said terminal joints thus being disposed in a substantially lateral relationship, with said central joint being a distance away from a substantially laterally extending line connecting said terminal joints, said group further including
        (4) yieldably resilient means incorporated in at least a portion of said central and terminal joints, said central and terminal joints serving to prevent transmission of vibrations of said drum.
3. In the washing machine according to claim 2, said rigid members extending sideways and downwardly from said central joint, the space bounded by said rigid members opening downwardly.
4. In the washing machine according to claim 3, said central and terminal joints having axes parallel to each other, the axis of said central joint being equally spaced from the axes of said terminal joints.
5. In the washing machine according to claim 3, said rigid members forming an angle of approximately 90°, with said elastic suspension means under static load, said angle opening downwardly.

6. In the washing machine according to claim 2, said resilient suspension means being constituted by two systems of two of said groups, one out of the rigid members of each group being pivotally connected to said tank and extending in an inclined upward direction toward said central joint, the other rigid member of each group extending in an inclined downward direction away from said central joint.

References Cited by the Examiner

UNITED STATES PATENTS

| | | |
|---|---|---|
| 2,318,806 | 5/43 | Sisson. |
| 2,555,269 | 5/51 | Chamberlin _____ 68—140 |
| 2,785,557 | 3/57 | Stilwell _____ 68—24 |
| 2,948,401 | 8/60 | Obermajer _____ 210—365 |
| 2,975,626 | 3/61 | Frey _____ 68—24 X |

FOREIGN PATENTS

| | | |
|---|---|---|
| 218,995 | 1/62 | Austria. |
| 1,214,337 | 11/59 | France. |

IRVING BUNEVICH, *Primary Examiner.*

WALTER A. SCHEEL, *Examiner.*